UNITED STATES PATENT OFFICE.

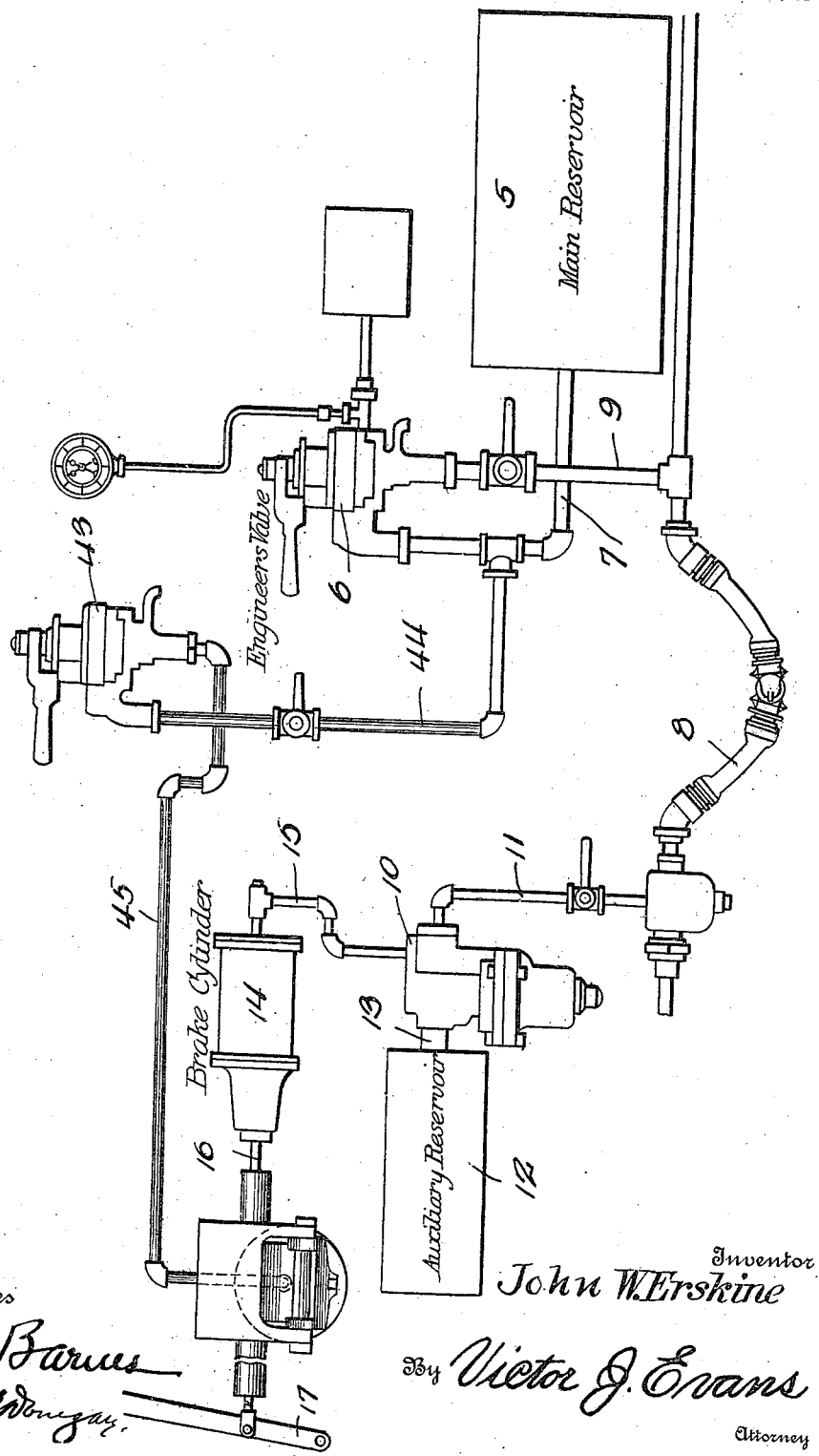

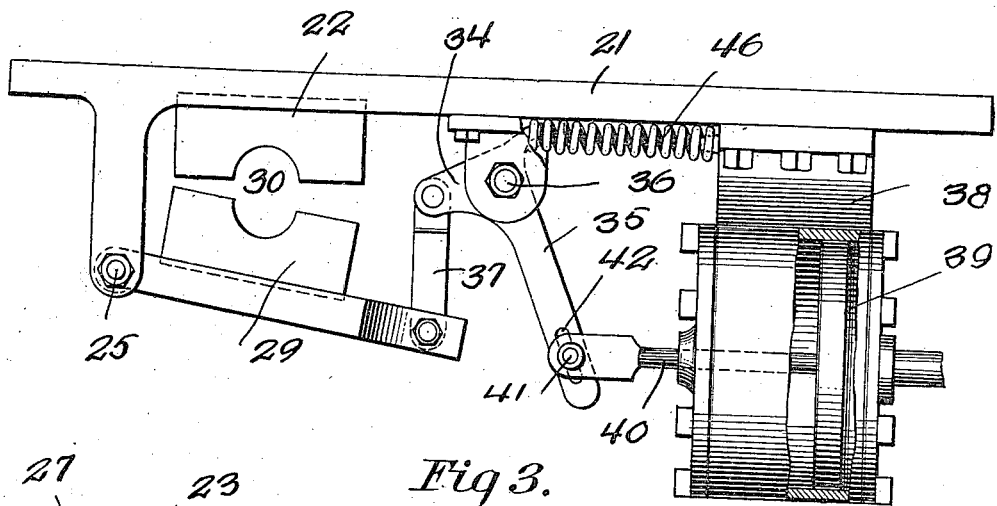
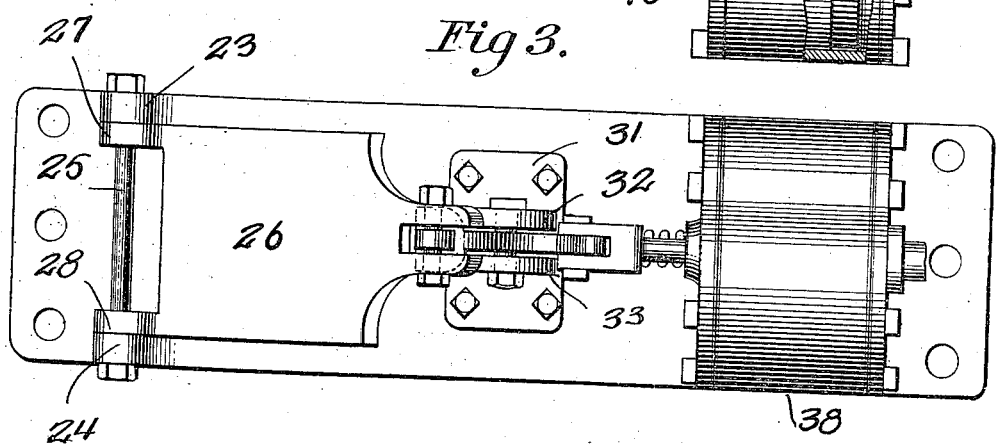
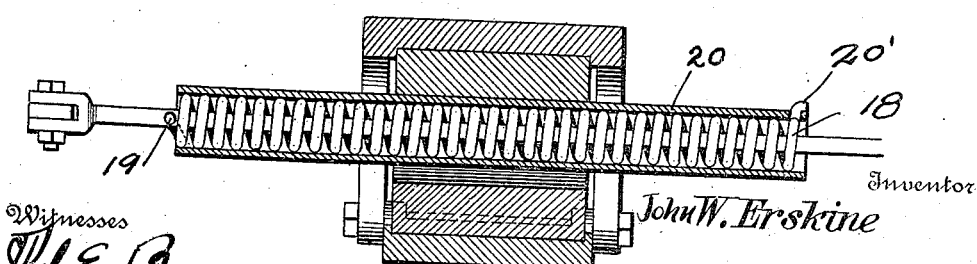

JOHN W. ERSKINE, OF MOUNT HOPE, WEST VIRGINIA.

AIR-BRAKE.

987,454.   Specification of Letters Patent.   Patented Mar. 21, 1911.

Application filed August 4, 1910. Serial No. 575,414.

*To all whom it may concern:*

Be it known that I, JOHN W. ERSKINE, a citizen of the United States, residing at Mount Hope, in the county of Fayette and State of West Virginia, have invented new and useful Improvements in Air-Brakes, of which the following is a specification.

This invention relates to improvements in brake locks for fluid pressure brake systems and has for one of its objects the provision of a lock actuated by main reservoir pressure to hold a brake rod against movement when the brakes are applied, whereby the fluid may be exhausted from the brake cylinder and the pressure in the auxiliary reservoir increased to the pressure in the train pipe without releasing the brakes.

Another object is the provision of a brake rod provided with a sleeve, the said sleeve being yieldingly secured to the brake rod in position to be engaged by the lock, thus permitting the pressure in the brake cylinder to be increased whenever desired without releasing the lock.

With these and other objects in view, which will more fully hereinafter appear, the present invention consists in certain novel details of construction and arrangement of parts, hereinafter fully described, illustrated in the accompanying drawings, and more particularly pointed out in the appended claims; it being understood that various changes in form, proportion, size and minor details of the device may be made, within the scope of the appended claims, without departing from the spirit or sacrificing any of the advantages of the invention.

In the accompanying drawings, forming a part of the specification;—Figure 1 is a diagrammatic view of a fluid-pressure brake system showing my improved device connected therewith. Fig. 2 is a front elevation of the lock in open position and also showing the cylinder partly in section. Fig. 3 is a plan view of the lock and cylinder. Fig. 4 is a sectional end view of the lock in closed position also showing the brake rod sleeve in longitudinal section and held by the lock.

Similar numerals of reference are employed to designate corresponding parts throughout.

The main reservoir of the air brake system herein shown is designated by the numeral 5, the engineer's valve casing by the numeral 6, and the connection between the engineer's valve casing and reservoir by the numeral 7. The train pipe is designated by the numeral 8 and has connection with the engineer's valve as shown at 9, and is further connected with a triple valve 10 by means of a valve-controlled pipe 11. The auxiliary reservoir 12 is connected with the triple valve, as shown at 13 and the brake cylinder 14 has connection with the triple valve by means of a pipe, as shown at 15. Since these parts are all of well-known construction detail descriptions of the same need not be given.

The brake rod is designated by the numeral 16 having on one end a piston, not shown, which is arranged in the brake cylinder, the opposite end of the brake rod being connected in the usual manner to a brake lever 17.

Encircling a portion of the brake rod is a helical retractile spring 18, one terminal of which is anchored in the rod as shown at 19. Receiving the spring 18 and corresponding to the length of the spring is a sleeve 20, in one end portion of which is fixedly secured the opposite terminal 20' of the spring 18. With this construction it will be manifest when the cylinder is held against movement that the brake rod may be moved.

The device forming one part of the subject matter of the present invention and co-operating with the sleeve to yieldingly hold the brake rod against movement is shown to include in its construction a base plate designated by the numeral 21. This member is positioned across the lower face of the floor of the car (not shown) having one end portion overlying the sleeve 20. Fixedly secured to the lower face of the base plate 21 is a block 22 having a semi-circular groove to receive a portion of the sleeve 20. Depending from one end portion of the lower face of the plate and arranged at the opposite sides thereof are a pair of hangers 23 and 24, the lower end portions of which are provided with alining openings for the reception of a shaft 25. The oblong plate is designated by the numeral 26 and is shown provided at one end with lugs 27 and 28, arranged between the hangers 23 and 24, the said lugs having alining openings to receive the shaft 25, as clearly shown in Fig. 3. The plate 26 is held substantially parallel with the base plate 21, in a manner to be presently described, and on its upper face is provided with a block 29 having a semi-circular groove to coincide with the groove in the block 22 and engage with the lower side of the sleeve 19. The circular opening 30 presented by the grooves when the blocks bear one upon the other will be of a diameter corresponding approximately to the diameter of the sleeve 19, so that when the blocks are held in close engagement endwise movement of the sleeve will be positively prevented.

Secured to the medial portion of the base plate 21 is a plate 31, from the medial portion of which depends a pair of spaced lugs 32 and 33. Positioned between the lugs 32 and 33 is a bell crank lever the sides of which are designated by the numerals 34 and 35, the said bell crank being provided at the juncture of the sides 34 and 35 with an opening to aline with openings in the lugs 32 and 33, the said openings receiving a shaft 36. The shorter arm 34 of the bell crank extends substantially parallel with the base plate 21 and overlies the free end portion of the oblong plate 26. Connection between the short arm 34 and free end portion of the plate 26 is established by means of a link 37, one end of which is pivoted to the short arm 34 and the lower end is pivoted in a slot formed in the free end portion of the plate 26, as clearly shown in Figs. 2 and 3. Depending from that end portion of the base plate 21 remote from the hangers 23 and 24 is a cylinder 38, the axis of which extends parallel to the length of the plate 21. Arranged in the cylinder is a piston 39 and secured to the center of one face of the piston is a rod 40, one end of which extends through an opening in that end of the cylinder adjacent to the bell crank lever. The outer end of the rod 40 is bifurcated and provided with a pin 41, the said bifurcated end of the rod receiving the lower end portion of the longer side 35 of the bell crank lever, the pin 41 passing through an elongated slot 42 formed in the longer side 35 of the bell crank lever and extending in the direction of the length of said side.

By reference now to Fig. 1 it will be seen that positioned adjacent to the engineer's valve casing is a similar valve casing designated by the numeral 43. Connection between the said valve casing 43 and the pipe 7 which connects the engineer's valve casing 6 with the main reservoir 5, is established by means of a valve-controlled pipe 44. Connection between another portion of the engineer's valve casing 43 and the head end of the cylinder 38 is established by means of a pipe 45.

In the operation of the device and assuming that the lock is in open position as shown in Fig. 2, wherein it will be seen that the piston 39 is adjacent to the head end of the cylinder, while the plate 26 and long side 35 of the bell crank lever inclines downwardly and toward the cylinder 38, assuming now that the brakes have been applied in the usual manner by exhausting from the train pipe 8 by means of the engineer's valve to permit the air from the auxiliary reservoir to enter the brake cylinder, and it is desired to increase the pressure in the auxiliary reservoir to that of the train pipe without releasing the brakes, and remembering now that connection between the cylinder 38 and pipe 7 is controlled by the valve in the casing 43, it will be evident when the said valve is opened that air will pass from the main reservoir through the pipes 44 and 45 and into the cylinder 38, whereby the piston 39 will be moved to the working end of the cylinder, thus rocking the bell crank and raising the plate 26, whereby the sleeve 20 will be clamped between the blocks 22 and 29.

When the parts are in these positions and it is desired to further increase the pressure in the brake cylinder, the release is accomplished in the usual manner, whereby the air entering the brake cylinder from the auxiliary reservoir will move the brake rod against the action of the spring 18 and independently of the sleeve 20, after which the air may be exhausted through the valve casing 43 which will permit the block 29 to be moved from the block 22, whereby the sleeve will move to its proper position on the rod 16 so that when pressure from the main reservoir is again admitted into the cylinder 38 the sleeve will be clamped again and when the air in the brake cylinder is exhausted the rod 16 will move against the action of the spring 18 and occupy substantially the same position as before increased pressure was admitted into the brake cylinder.

In order to aid the parts to open after the air has been exhausted from the cylinder 38 a helical compression spring 46 is employed. This member has one end connected with the bell crank lever at a point adjacent to the pivot point of the said bell crank, while its opposite end is connected with the cylinder 38, the spring extending parallel with the length of the base plate 21, so that when the parts are in locked position the spring will be compressed.

From the foregoing, it is evident that I have provided a device which is comparatively simple in structure and inexpensive in manufacture, embodying few parts and these so arranged that the danger of derangement will be reduced to a minimum.

I claim:—

1. In a fluid-pressure brake system, the combination with the main reservoir, train pipe, auxiliary reservoir, brake cylinder and brake rod; of a fluid-actuated lock connected with the main reservoir and adapted to hold the brake rod against movement when the brakes are applied, whereby the brake cylinder may be exhausted and the pressure in the auxiliary reservoir increased to that in the train pipe without releasing the brakes.

2. In a fluid-pressure brake system the combination with the main reservoir, train pipe, auxiliary reservoir, brake cylinder and brake rod; of a fluid-actuated lock connected with the main reservoir and adapted to yieldingly hold the brake rod against movement when the brakes are applied, whereby the brake cylinder may be exhausted and the pressure in the auxiliary reservoir increased to that in the train pipe without releasing the brakes.

3. In a fluid-pressure brake system, the combination with a main reservoir, train pipe, auxiliary reservoir, brake cylinder and brake rod; of a sleeve yieldingly connected to the brake rod, a fluid-actuated lock connected with the main reservoir and adapted to engage the sleeve to yieldingly hold the brake rod against movement when the brakes are applied, whereby the brake cylinder may be exhausted and the pressure in the auxiliary reservoir increased to that in the train pipe without releasing the brakes.

4. In a fluid-pressure brake system the combination with the main reservoir, train pipe, auxiliary reservoir, brake cylinder and brake rod; of a fluid-actuated lock including a stationary member and a movable member, the latter being operable by the pressure of the main reservoir to coöperate with the stationary member to lock the brake rod against movement when the brakes are applied, whereby the brake cylinder may be exhausted and the pressure in the auxiliary reservoir increased to that in the train pipe without releasing the brakes.

5. In a fluid-pressure brake system, the combination with the main reservoir, train pipe, auxiliary reservoir, brake cylinder and brake rod; of a sleeve yieldingly connected to the brake rod, a fluid-actuated lock including a stationary member and a movable member, the latter being connected to the main reservoir and operable by the pressure in the latter to coöperate with the stationary member to clamp the sleeve against movement when the brakes are applied, whereby the brake cylinder may be exhausted and the pressure in the auxiliary reservoir increased to that in the train pipe without releasing the brakes.

In testimony whereof I affix my signature in presence of two witnesses.

JOHN W. ERSKINE.

Witnesses:
W. H. BOONE,
L. S. TULLY.